(12) United States Patent
Glover

(10) Patent No.: US 10,761,197 B2
(45) Date of Patent: Sep. 1, 2020

(54) SENSOR ARRANGEMENT AND METHOD FOR DETERMINING TIME-OF-FLIGHT

(71) Applicant: ams AG, Unterpremstaetten (AT)

(72) Inventor: Kerry Glover, Rockwall, TX (US)

(73) Assignee: ams AG, Unterpremstaetten (AT)

( * ) Notice: Subject to any disclaimer, the term of this patent is extended or adjusted under 35 U.S.C. 154(b) by 253 days.

(21) Appl. No.: 15/777,887

(22) PCT Filed: Nov. 14, 2016

(86) PCT No.: PCT/EP2016/077576
§ 371 (c)(1),
(2) Date: May 21, 2018

(87) PCT Pub. No.: WO2017/089159
PCT Pub. Date: Jun. 1, 2017

(65) Prior Publication Data
US 2018/0341010 A1  Nov. 29, 2018

Related U.S. Application Data

(60) Provisional application No. 62/259,019, filed on Nov. 23, 2015.

(51) Int. Cl.
*G01S 7/486* (2020.01)
*G01S 17/10* (2020.01)
(Continued)

(52) U.S. Cl.
CPC .......... *G01S 7/4865* (2013.01); *G01S 7/4861* (2013.01); *G01S 7/4915* (2013.01); *G01S 17/10* (2013.01); *G01S 17/36* (2013.01); *G01S 17/89* (2013.01)

(58) Field of Classification Search
CPC ...... G01S 7/4861; G01S 7/4915; G01S 17/36; G01S 7/4865; G01S 17/10; G01S 17/894; G01S 17/89
(Continued)

(56) References Cited

U.S. PATENT DOCUMENTS 9,116,511 B2 *  8/2015  Bang .................... G04F 10/005
10,126,411 B2 *  11/2018  Gilliland ................ G01S 17/89
(Continued)

FOREIGN PATENT DOCUMENTS

DE   10153742 A1   5/2003
EP   2159603 A1   3/2010
WO   2011100480 A1   8/2011

*Primary Examiner* — Daniel L Murphy
(74) *Attorney, Agent, or Firm* — Fish & Richardson P.C.

(57) ABSTRACT

A sensor arrangement for determining time-of-flight comprises an emitter configured to periodically emit pulses of electromagnetic radiation depending on a first clock signal, a photonic demodulator configured to detect electromagnetic radiation during detection intervals comprising first and second intervals and a processing circuit. A timing of the detection intervals is defined by a second clock signal having a phase difference with respect to the first clock signal. The demodulator is configured to generate demodulator signals depending on energy of the radiation detected during at least one of the first intervals and at least one of the second intervals, respectively. The processing circuit is configured to adapt the phase difference based on the demodulator signals and to generate an output signal indicative of the time-of-flight based on the phase difference.

14 Claims, 4 Drawing Sheets

(51) Int. Cl.
  *G01S 7/4865* (2020.01)
  *G01S 7/4861* (2020.01)
  *G01S 17/36* (2006.01)
  *G01S 7/4915* (2020.01)
  *G01S 17/89* (2020.01)

(58) Field of Classification Search
  USPC ..................................................... 356/5.01
  See application file for complete search history.

(56) References Cited

U.S. PATENT DOCUMENTS

| | | |
|---|---|---|
| 2009/0045359 A1 | 2/2009 | Kumahara et al. |
| 2010/0244921 A1 | 9/2010 | Barbier |
| 2012/0212273 A1 | 8/2012 | Nguyen et al. |
| 2013/0181119 A1 | 7/2013 | Bikumandla et al. |
| 2015/0204970 A1 | 7/2015 | Jeong et al. |
| 2015/0285623 A1 | 10/2015 | Tachibana |

\* cited by examiner

SENSOR ARRANGEMENT AND METHOD FOR DETERMINING TIME-OF-FLIGHT

BACKGROUND OF THE INVENTION

The disclosure relates to the field of determining a time-of-flight of electromagnetic radiation. More specifically, the disclosure relates to a sensor arrangement and a method for determining a time-of-flight of electromagnetic radiation.

Time-of-flight sensors may have many applications related to distance measurement including for example proximity detection, assisting the autofocusing of digital cameras, multi-zone autofocus, gesture detection or 3D camera applications. A distance D between an object and the sensor may then be calculated as $D = \text{tof}/(2c)$, where tof denotes the time-of-flight of electromagnetic radiation from the sensor to the object and back and c denotes the speed of light.

For determining the time-of-flight, pulses of electromagnetic radiation may be sent out and the reflections from an object may be detected. In existing approaches to time-of-flight measurement, the emitted pulses may be relatively long to increase a measurable distance. This, however relates to an increased power consumption.

Furthermore, existing approaches may need to compensate ambient light effects by measuring and subtracting ambient light signals. This causes an increased complexity.

SUMMARY OF THE INVENTION

The present disclosure provides an improved concept for determining a time-of-flight of electromagnetic radiation that allows for decreased power consumption and complexity.

According to the improved concept, pulses of electromagnetic radiation are emitted periodically depending on a first clock signal. Emitted pulses being at least partially reflected by an external object are detected, wherein the detected pulses are separated at least into a first and a second interval and a timing of the first and the second interval is determined by a second clock signal. Then, a phase of the second clock signal is varied to determine a phase difference between the first and the second clock signal at which fractions of energy detected during the first and the second interval have the same amplitude. Consequently, an output signal indicative of time-of-flight of the emitted and at least partially reflected pulses is generated based on the phase difference. In particular, the phase difference represents a direct measure for the time-of-flight if the energy detected during the first and the second interval have the same amplitude.

According to the improved concept, a sensor arrangement for determining a time-of-flight of electromagnetic radiation is provided. The sensor arrangement comprises an emitter configured to periodically emit pulses of electromagnetic radiation depending on a first clock signal.

The sensor arrangement further comprises a photonic demodulator configured to detect electromagnetic radiation during detection intervals. Therein, a timing of the detection intervals is defined by a second clock signal having a phase difference with respect to the first clock signal and each of the detection intervals comprises a first interval and a second interval following the first interval, in particular following directly after the first interval. The photonic demodulator is further configured to generate a first demodulator signal depending on energy of the radiation detected during at least one of the first intervals and to generate a second demodulator signal depending on energy of the radiation detected during at least one of the second intervals.

The sensor arrangement also comprises a processing circuit configured to adapt the phase difference based on the first and the second demodulator signal and to generate an output signal being indicative of the time-of-flight based on the phase difference.

The emitter emits for example electromagnetic radiation during emission intervals, the emission intervals being separated by pause intervals during which the emitter does not emit electromagnetic radiation. For example, the emitter emits a first pulse of electromagnetic radiation during a first emission interval, then does not emit electromagnetic radiation during a first pause interval following the first emission interval, then emits a second pulse of electromagnetic radiation during a second emission interval and does not emit electromagnetic radiation during a second pause interval following the second emission interval, and so forth. The emissions intervals may have for example the same length. The pause intervals may have for example the same length. The length of the emission intervals may be equal or different from the length of the pause intervals.

The electromagnetic radiation detected by the photonic demodulator during the detection intervals corresponds for example to the pulses of electromagnetic radiation being emitted by the emitter and being at least partially reflected by an external object. Therein, each emitted and partially reflected pulse may be detected or partially detected during a respective one of the detection intervals. For example, the first pulse being at least partially reflected by the external object is detected or partially detected by the photonic demodulator during a first detection interval of the detection intervals, the second pulse being at least partially reflected by the external object is detected or partially detected during the second detection interval of the detection intervals and so forth.

The photonic demodulator is in general implemented as a photonic sensor, in particular a high-speed photonic sensor, which is configured to separate received pulses of electromagnetic radiation into two or more fractions and determine the energy of the two or more fractions individually. Such a photonic demodulator may for example also be denoted as a photonic mixer.

The photonic demodulator is configured to separate the detected electromagnetic radiation during one of the detection intervals into a first fraction detected during the first interval of the detection interval and into a second fraction detected during the second interval of the detection intervals. Thus, the first and the second demodulator signal are generated depending on the energy of radiation of the first fraction and the second fraction, respectively.

The first clock signal determines a timing of the emission of the pulses emitted by the emitter. In particular, the first clock signal determines a respective starting time for each of the emitted pulses. For example, the emitter may be configured to emit the pulses with a period corresponding to a period of the first clock signal or a fraction or an multiple of the period of the first clock signal. For example one of the emitted pulses may be emitted by the emitter at each rising edge and/or at each falling edge of the first clock signal.

The second clock signal defines the timing of the detection intervals and consequently of the first and second intervals of the detection intervals. In particular, the second clock signal defines a respective starting time for each of the detection intervals. Consequently, it depends on the second clock signal, in particular on the phase difference with respect to the first clock signal, how much of the electromagnetic radiation detected during one of the detection intervals is detected during the corresponding first interval of the one of the detection intervals and how much of the electromagnetic radiation detected during the one of the detection intervals is detected during the corresponding second interval of the one of the detection intervals.

That is, the second clock signal and in particular the phase difference define an energy ratio. Therein, the energy ratio is a ratio of energy of the radiation, which is being detected during the first interval of one of the detection intervals, to energy of the radiation, which is being detected during the second interval of the one of the detection intervals.

Hence, the first and the second demodulator signal contain information about the energy ratio, in particular indicate the energy ratio. Furthermore, the energy ratio is directly related to a time difference between the emission of one of the emitted pulses, for example a start of the emission, an end of the emission and/or an instance between the start and the end of the emission such as a center of the emission interval, and the end of the first interval of the one of the detection intervals. Therein, the end of the first interval coincides with the start of the second interval of the one of the detection intervals.

Consequently, if the end of the first interval and the start of the second interval of the one of the detection intervals coincide with a specified temporal position of the respective partially reflected and detected pulse, the time difference is a measure for the time-of-flight.

The time-of-flight is a time-of-flight of the emitted and at least partially reflected pulse from the sensor arrangement to the external object and back to the sensor arrangement, in particular from the emitter to the external object back to the photonic demodulator. For example, if the end of the first interval and the start of the second interval of the one of the detection intervals coincide with a center of the respective partially reflected and detected pulse, the time difference between the center of the emitted pulse and the center of the respective reflected pulse corresponds to the time-of-flight.

The processing circuit is for example configured to generate the output signal based on the time difference. Thus, the output signal is a measure for the time-of flight, in particular if the end of the first interval and the start of the second interval of the one of the detection intervals coincide with the center of the respective partially reflected and detected pulse.

The first and the second demodulator signal may be utilized by the processing circuit to determine how well the end of the first interval and the start of the second interval coincide with the specified temporal position, for example the center, of the respective partially reflected in detected pulse. For example, if the first and the second demodulator signal indicate that the energy ratio is equal to unity, the end of the first interval and the start of the second interval of the one of the detection intervals coincide or approximately coincide with the center of the detected pulse.

The adapting of the phase difference based on the first and the second demodulator signal by the processing circuit may include adapting the phase difference based on one or more signals depending on the first and the second demodulator signal.

Using the improved concept for determining the time-of-flight consequently allows to reduce a length of the emitted pulses without restricting a maximum time-of-flight and corresponding distance of the external object to be determined. Thus, power consumption may be reduced. Furthermore, the overall period of the periodic emitting of pulses may be increased, that is less pulses may be emitted in a given time or in other words the frequency of pulse emission may be decreased, without increasing the length of the individual emitted pulses. Hence, the maximum time-of-flight and corresponding distance of the external object to be determined may be increased without increasing power consumption.

The electromagnetic radiation may for example be light, for example visible light or infrared light.

According to some implementations of the sensor arrangement, the emitter is implemented as a light emitting diode, LED, or as a laser, in particular a laser diode, for example a vertical-cavity surface-emitting laser, VCSEL.

According to some implementations of the sensor arrangement, the processing circuit or components of the processing circuit are comprised by a custom state machine or by a CPU.

According to some implementations of the sensor arrangement, the photonic demodulator is implemented as a photonic mixer device, PMD, a current assisted photonic demodulator, CAPD, a lateral drift-field photodetector, LDPD or another photonic mixer device with two or more detectors or collectors.

According to some implementations of the sensor arrangement, the processing circuit is configured to regulate an energy ratio to a target ratio by adapting the phase difference, wherein the energy ratio is a ratio of energy of the radiation, which is being detected during the first interval of one of the detection intervals, to energy of the radiation, which is being detected during the second interval of the one of the detection intervals.

According to some implementations, a target ratio is equal to unity.

The processing circuit is for example configured to adapt the phase difference if the energy ratio lies outside a predefined tolerance window around the target ratio.

By regulating the energy ratio to the target ratio, for example to unity, it is achieved that the end of the first interval and the start of the second interval of the one of the detection intervals coincide with the specified temporal position, for example the center, of the partially reflected and detected pulse.

In a realistic situation, the photonic demodulator may detect not only electromagnetic radiation originating from the emitted and partially reflected pulses but also from ambient light. The amount of ambient light impinging on the photonic demodulator is, however, constant or approximately constant during one of the detection intervals. Thus, due to the concept of regulating the energy ratio, effects of the ambient light are for example inherently cancelled or reduced. This leads to a reduced complexity of the sensor arrangement according to the improved concept.

According to some implementations of the sensor arrangement, the processing circuit is configured to adapt the phase difference by adapting a phase of the second clock signal based on the first and the second demodulator signal.

According to some implementations of the sensor arrangement, the processing circuit comprises a deviation unit configured to generate at least one steering signal based on the first and the second demodulator signal. The processing circuit is configured to adapt the phase difference based on the at least one steering signal.

According to some implementations of the sensor arrangement, the at least one steering signal indicates whether a difference value of the first and the second demodulator signal lies within a predefined first range.

The difference value is for example a difference between a value of the first demodulator signal and a value of the second demodulator signal. The difference value may also be a value of an integrated difference between the first and the second demodulator signal.

The first range may for example be defined by a first lower boundary value and a first upper boundary value. That is, the first range is bounded on both sides. If the difference value lies within the first range, the energy ratio lies within the tolerance window around the target ratio. Consequently, if the difference value lies outside the first range when the energy ratio lies outside the tolerance window.

Consequently, the energy ratio may be regulated to the target ratio by adapting the phase difference to regulate the difference value to lie within the first range, in particular to a target difference value within the first range.

According to some implementations of the sensor arrangement, the at least one steering signal indicates whether a value of the first demodulator signal lies within a predefined second range and/or a value of the second demodulator signal lies within the second range.

The second range may for example be defined by a second upper boundary value or by a second lower boundary value. That is, the second range may be a half bounded range.

If the value of the first demodulator signal and/or the value of the second demodulator signal lies outside the second range, the energy ratio lies outside the tolerance window. If the value of the first demodulator signal the value of the second demodulator signal both, the energy ratio lies within the tolerance window.

In some implementations, the energy ratio corresponds or approximately corresponds to the target ratio if the value of the first demodulator signal and the value of the second demodulator signal both are equal or approximately equal to the second upper boundary value or the second lower boundary value.

Consequently, the energy ratio may be regulated to the target ratio or to lie within the tolerance window around the target ratio by adapting the phase difference to regulate the first and the second demodulator signal to lie within the second range. In particular, the energy ratio may be regulated to the target ratio by adapting the phase difference to regulate the first and the second demodulator signal to the second upper boundary value or the second lower boundary value.

According to some implementations of the sensor arrangement, the processing circuit comprises a delay unit configured to generate the second clock signal by delaying the first clock signal by a delay, the delay depending on the first and the second demodulator signal and/or on the at least one steering signal.

The delay unit has the first clock signal as an input, the second clock signal as an output and at least one of the first demodulator signal, the second demodulator signal and the at least one steering signal as a control input for controlling a value of the delay.

The delay defines the phase difference of the second clock signal with respect to the first clock signal. Since the delay depends on the first and the second demodulator signal, the delaying of the first clock signal may be used to adapt the phase difference depending on the first and the second demodulator signal. Hence, the processing circuit is configured to adapt the phase difference by adapting the delay based on the first and the second demodulator signal by means of the delay unit. In particular, the processing and is configured to regulate an energy ratio to the target ratio by adapting the delay.

According to some implementations, the delay unit is configured to increase and/or decrease the delay depending on the first and the second demodulator signal, in particular depending on the at least one steering signal.

According to some implementations, the at least one steering signal comprises a pump up and/or a pump down signal. The delay unit is then configured to increase the delay depending on the pump up signal and/or to decrease the delay depending on the pump down signal.

In this way, the energy ratio may be regulated to the target ratio. In particular, if the first and/or the second demodulator signal indicate that the energy ratio lies outside the tolerance window around the target ratio, the delay may be increased and/or decreased correspondingly.

For example, the delay unit is configured to increase the delay in response to a pulse comprised by the pump up signal and/or to decrease the delay in response to a pulse comprised by the pump down signal. Alternatively, the delay unit may be configured to increase the delay when the pump up signal assumes a first logic level, for example logic high, and/or to decrease the delay when the pump down signal assumes the first logic level.

According to some implementations of the sensor arrangement, the processing circuit, in particular the delay unit, is configured to generate the output signal based on the delay.

If the energy ratio is regulated to, in particular corresponds to, the target ratio, a corresponding value of the delay is a measure for the time-of-flight.

The output signal may for example be given by the phase difference or the delay or the output signal may be proportional to the phase difference or the delay.

The time-of-flight may be given by a value of the output signal or may be proportional to the value of the output signal. The time-of-flight may also be given by or be proportional to a sum of the value of the output signal and a predefined constant shift value.

According to some implementations of the sensor arrangement, the delay unit comprises delay element, in particular a programmable delay element, a delay line, in particular a programmable delay line, and/or a delay-locked loop circuit.

According to some implementations of the sensor arrangement, the processing circuit, in particular the delay unit, comprises a time-to-digital converter configured to generate the output signal based on the first and the second clock signal. In particular, the time-to-digital converter is configured to measure the delay and to generate the output signal based on the delay.

The time-to-digital converter uses for example the first clock signal as a first input and the second clock signal as a second input. The first clock signal acts as a start signal, in particular a rising edge and/or a falling edge of the first clock signal acts as a start instance, for the time-to-digital converter and the second clock signal acts as a stop signal, in particular a rising edge and/or a falling edge of the second clock signal acts as a stop instance, of the time-to-digital converter. The time-to-digital converter is configured to determine an elapsed time between the start and the stop instance and to generate the output signal depending on the elapsed time.

According to some implementations of the sensor arrangement, the processing circuit, in particular the delay unit, comprises a delay line configured to generate at least two intermediate clock signals by delaying the first clock signal. The processing circuit further comprises a multiplexer configured to generate the second clock signal by selecting one of the at least two intermediate clock signals depending on the first and the second demodulator signal.

The delay line and/or the multiplexer may for example be comprised by a time-to-digital converter.

The delay line is configured to generate a first intermediate clock signal of the at least two intermediate clock signals by delaying the first clock signal by a first intermediate delay and to generate a second intermediate clock signal of the at least two intermediate clock signals by delaying the first intermediate clock signal by a second intermediate delay, wherein the second intermediate delay may be equal to the first intermediate delay.

The delay line may for example be configured to generate a third intermediate clock signal of the at least two intermediate clock signals by delaying the second intermediate clock signal by a third intermediate delay, wherein the third intermediate delay may be equal to the first intermediate delay and so forth.

The delay line comprises at least two delay elements coupled in series. A first delay element of the at least two delay elements has the first clock signal as an input and the first intermediate clock signal as an output. Each delay element of the at least two delay elements except for the first delay element has one of the at least two intermediate clock signals generated by a preceding delay element of the at least two delay elements as an input and a respective intermediate clock signal of the at least two intermediate clock signals as an output. For example, the second delay element of the at least two delay elements has the first intermediate clock signal as an input and the second intermediate clock signal as an output.

The at least two delay elements may comprise a third delay element coupled having the second intermediate clock signal as an input and the third intermediate clock signal as an output and so forth.

The multiplexer has the at least two intermediate clock signals as an input and the second clock signal as an output.

By selecting the one of the at least two intermediate clock signals, the energy ratio is for example regulated to the target ratio.

The multiplexer may be configured to receive a selection signal depending on the first and the second demodulator signal, in particular depending on the at least one steering signal, and to select the one of the at least two intermediate clock signals based on the selection signal.

Each of the at least two intermediate clock signals has a respective delay with respect to the first clock signal. For example, the first intermediate clock signal has a delay with respect to the first clock signal given by the first intermediate delay. The second intermediate clock signal has a delay with respect to the first clock signal given by a sum of the first and the second intermediate delay, that is for example twice the first intermediate delay, and so forth.

The delay by which the first clock signal is delayed to generate the second clock signal is given by the respective delay of the selected intermediate clock signal with respect to the first clock signal.

According to some implementations of the sensor arrangement, the delay unit comprises a control unit configured to generate the selection signal based on the first and the second demodulator signal, in particular based on the at least one steering signal.

According to some implementations of the sensor arrangement, the deviation unit comprises a differential integrator configured to generate an integrated difference signal depending on a difference between the first and the second demodulator signal.

The differential integrator comprises for example an amplifier, for example a differential amplifier, for example an operational amplifier, with a first input coupled to the first demodulator signal and a second input coupled to the second demodulator signal. Thus, the integrated difference signal is generated by integrating a difference between the first and the second demodulator signal. The difference value is then for example a value of the integrated difference signal.

According to some implementations of the sensor arrangement, the differential integrator comprises a first capacitor coupled between the first input of the operational amplifier and an output of the operational amplifier.

According to some implementations of the sensor arrangement, the differential integrator comprises a second capacitor coupled between the second input of the operational amplifier and the output of the operational amplifier.

According to some implementations of the sensor arrangement, the deviation unit comprises a first comparator configured to generate a first steering signal of the least one steering signal based on a comparison of a value of the integrated difference signal to a predefined first threshold value. The deviation unit also comprises a second comparator configured to generate a second steering signal of the least one steering signal based on a comparison of the value of the integrated difference signal to a predefined second threshold value.

The first threshold value is for example the lower boundary value of the first range and the second threshold value is for example the upper boundary value of the first range.

The first comparator is for example configured to generate the first steering signal assuming a first logic level, for example logic high, if the value of the integrated difference signal is less than the first threshold value and assuming a second logic level, for example logic low, if the value of the integrated difference signal is greater than the first threshold value.

The second comparator is for example configured to generate the second steering signal assuming the first logic level if the value of the integrated difference signal is greater than the second threshold value and assuming the second logic level if the value of the integrated difference signal is less than the second threshold value.

The delay unit is then for example configured to increase the delay when the first steering signal assumes the first logic level and the second steering signal assumes the second logic level. Further, the delay unit is for example configured to decrease the delay when the second steering signal assumes the first logic level and the first steering signal assumes the second logic level. The delay unit is for example configured not to change the delay if the first and the second steering signal both assume the first logic level or both assume the second logic level.

In a sense, the first and the steering signals can therefore be regarded as pump up and pump down signals, respectively, causing the delay unit to increase or decrease the delay, respectively.

In this way, the energy ratio is regulated to the target ratio by regulating the value of the integrated difference signal to a value between the first and the second threshold value, for example to an average value of the first and the second threshold value. The first range as well as the first and the second threshold value, respectively, implement a hysteresis of the integrated difference signal avoiding a permanent change of the delay.

According to some implementations of the sensor arrangement, the deviation unit further comprises an integrator controller configured to reset the differential integrator and/or to control an overall timing of the integration of the differential integrator.

According to some implementations of the sensor arrangement, the deviation unit comprises a first pulse generator configured to generate the first steering signal of the at least one steering signal based on a comparison of the first demodulator signal to a predefined third threshold value. The deviation unit also comprises a second pulse generator configured to generate the second steering signal based on a comparison of the second demodulator signal to the predefined threshold value.

According to some implementations, the deviation unit comprises a third comparator configured to compare the value of the first demodulator signal to the third threshold value. The first pulse generator is configured to generate a pulse in the first steering signal whenever the value of the first demodulator signal exceeds the third threshold value.

The third threshold value defines the second range. In particular, the third threshold value is for example the second upper boundary value of the second range.

According to some implementations, the deviation unit is configured to reset the first demodulator signal depending on the first steering signal. In particular, the deviation unit may reset the first demodulator signal whenever the first steering signal has a pulse, for example a logic high pulse.

According to some implementations, the deviation unit comprises a fourth comparator configured to compare the value of the second demodulator signal to the third threshold value. The second pulse generator is configured to generate a pulse in the second steering signal whenever the value of the second demodulator signal exceeds the third threshold value.

In case the first pulse generator generates a pulse in the first steering signal and the second portion or to generate a pulse and the second steering signal, the delay unit may be configured to increase and immediately decrease again the delay or vice versa, effectively leaving the delay unchanged.

According to some implementations, the deviation unit is configured to reset the second demodulator signal depending on the second steering signal. In particular, the deviation unit may reset the second demodulator signal whenever the second steering signal has a pulse, for example a logic high pulse.

The delay unit is then for example configured to increase the delay whenever the first steering signal has a pulse, for example a logic high pulse. Further, the delay unit is for example configured to decrease the delay when the second steering signal has a pulse, for example a logic high pulse.

Thus, the first and the steering signals can be regarded as pump up and pump down signals, respectively, causing the delay unit to increase or decrease the delay, respectively. In contrast to implementations comprising the differential integrator, the first and the second demodulator signal are processed independently of each other in implementations comprising the first and the second pulse generator.

In this way, the energy ratio is regulated to the target ratio by regulating the value of the first and the second demodulator signal to lie at or below the third threshold value.

According to some implementations of the sensor arrangement, the deviation unit comprises an analog-to-digital converter configured to convert the first demodulator signal into a first digital signal and the second demodulator signal into a second digital signal.

In alternative implementations, the analog-to-digital converter is configured to convert the first and the second demodulator signal into a digital difference signal. The digital difference signal corresponds for example to a value of the difference between the first and the second demodulator signal.

According to some implementations of the sensor arrangement, the deviation unit comprises a digital differentiator configured to generate the at least one steering signal depending on the first and the second digital signal.

The digital differentiator may for example generate the at least one steering signal depending on a difference between a value of the first digital signal and a value of the second digital signal.

In alternative implementations, the digital differentiator is configured to generate the at least one steering signal depending on the digital difference signal.

According to some implementations of the sensor arrangement, the photonic demodulator comprises a first collector configured to generate the first demodulator signal based on the energy of the radiation detected during the at least one of the first intervals. The photonic demodulator comprises a second collector configured to generate the second demodulator signal based on the energy of the radiation detected during the at least one of the second intervals.

According to some implementations of the sensor arrangement, the photonic demodulator comprises at least one further collector.

According to the improved concept also a method for determining a time-of-flight of electromagnetic radiation is provided. The method comprises periodically emitting pulses of electromagnetic radiation depending on a first clock signal and detecting electromagnetic radiation during detection intervals. Therein, a timing of the detection intervals is defined by a second clock signal having a phase difference with respect to the first clock signal and each of the detection to love comprises a first interval and a second interval following the first interval.

The method further comprises generating a first demodulator signal depending on energy of the radiation detected during the at least one of the first intervals and generating a second demodulator signal depending on energy of the radiation detected during at least one of the second intervals. Moreover, the method comprises adapting the phase difference based on the first and the second demodulator signal and generating an output signal being indicative of the time-of-flight based on the phase difference.

Further implementations of the method are readily derived from the various implementations and embodiments of the sensor arrangement and vice versa.

BRIEF DESCRIPTION OF THE DRAWINGS

In the following, the improved concept is explained in detail with the aid of exemplary implementations by reference to the drawings. Components that are functionally identical or have an identical effect may be denoted by identical references.

Identical components and/or components with identical effects may be described only with respect to the figure where they occur first and their description is not necessarily repeated in subsequent figures.

In the drawings,

FIG. 1 shows an exemplary implementation of a sensor arrangement according to the improved concept;

FIG. 2A shows a timing diagram of emitted and partially reflected electromagnetic pulses as well as clock signals in accordance with the improved concept;

FIG. 2B shows a further timing diagram of emitted and partially reflected electromagnetic pulses as well as clock signals in accordance with the improved concept;

FIG. 2C shows a further timing diagram of emitted and partially reflected electromagnetic pulses as well as clock signals in accordance with the improved concept;

FIG. 3 shows a further exemplary implementation of a sensor arrangement according to the improved concept;

FIG. 4 shows a further exemplary implementation of a sensor arrangement according to the improved concept;

FIG. 5 shows a further exemplary implementation of a sensor arrangement according to the improved concept;

FIG. 6 shows an exemplary implementation of a delay unit for implementation in a sensor arrangement according to the improved concept;

FIG. 7 shows a further exemplary implementation of a delay unit for implementation in a sensor arrangement according to the improved concept;

FIG. 8A shows a schematic representation of an exemplary implementation of a photonic demodulator for implementation in a sensor arrangement according to the improved concept;

FIG. 8B shows a schematic representation of a further exemplary implementation of a photonic demodulator for implementation in a sensor arrangement according to the improved concept;

Figure 9:
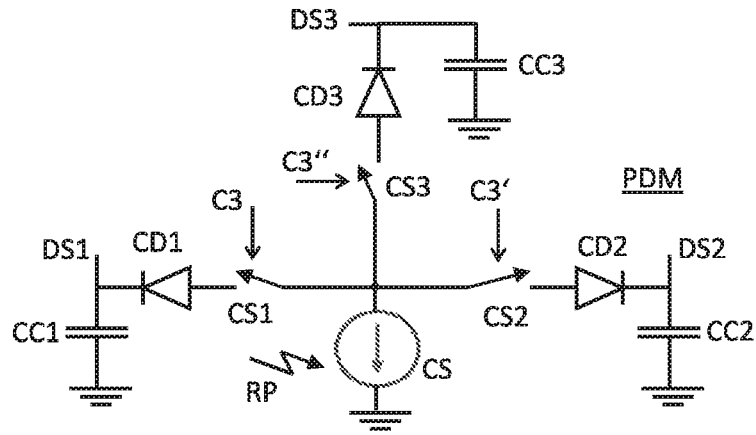
Figure 10A:
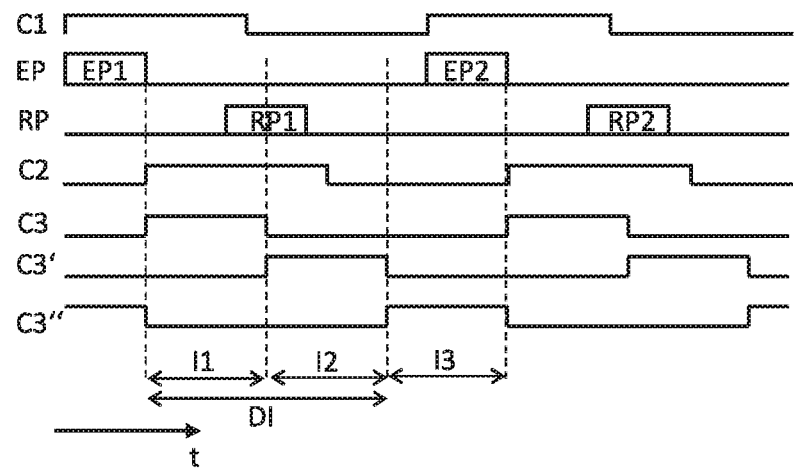
Figure 10B:
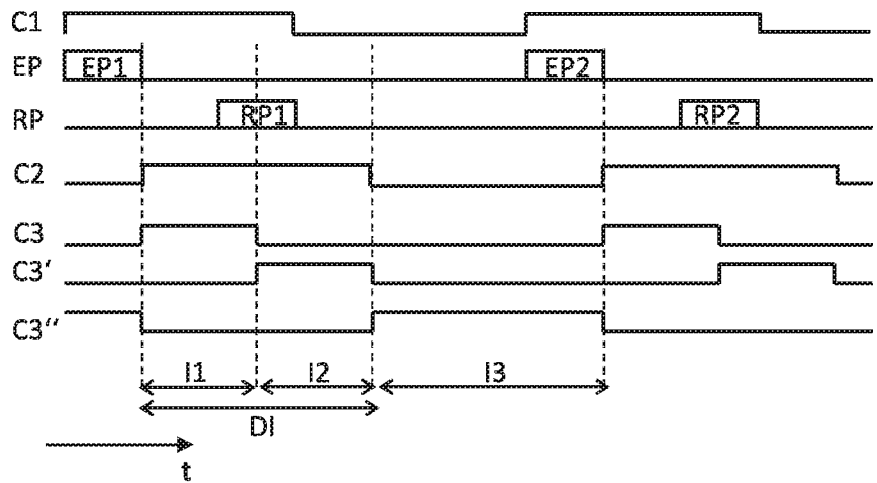

FIG. 9 shows a schematic representation of a further exemplary implementation of a photonic demodulator for implementation in a sensor arrangement according to the improved concept;

FIG. 10A shows a further timing diagram of emitted and partially reflected electromagnetic pulses as well as clock signals in accordance with the improved concept; and FIG. 10B shows a further timing diagram of emitted and partially reflected electromagnetic pulses as well as clock signals in accordance with the improved concept.

DETAILED DESCRIPTION

Figure 1:
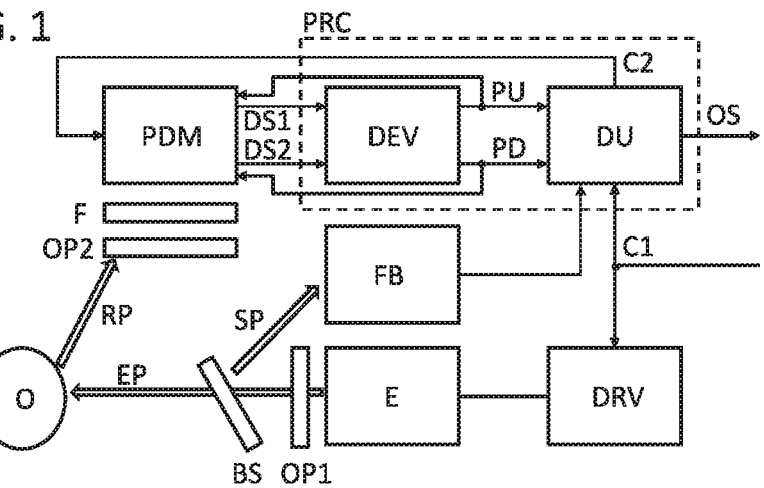

FIG. 1 shows an exemplary implementation of a sensor arrangement according to the improved concept. The sensor arrangement comprises an emitter E and a driver DRV coupled to the emitter E. The sensor arrangement further comprises a photonic demodulator PDM and a processing circuit PRC coupled to the photonic demodulator PDM. A first clock signal C1 is supplied to the processing circuit PRC and to the driver DRV. Furthermore, an external object O is shown, which is not comprised by the sensor arrangement.

The driver DRV is for example configured to drive the emitter E depending on the first clock signal C1. The emitter E is configured to emit electromagnetic radiation, in particular to emit pulses EP of electromagnetic radiation depending on the first clock signal C1. The electromagnetic radiation is for example light, in particular visible light or infrared light.

The emitted pulses EP may for example hit the external object 0 and may be at least partially reflected from the external object 0, resulting in corresponding reflected pulses RP. The reflected pulses are PR for example detected by the photonic demodulator PDM.

The photonic demodulator PDM is for example implemented as a photonic demodulator or photonic mixer utilizing two or more photodetectors, photodetector cells, photodetector units or collectors. The photonic demodulator PDM is for example configured to detect electromagnetic radiation impinging on the photonic demodulator PDM by means of the two or more photodetectors or collectors in two or more respective time intervals. In particular, the photonic demodulator PDM may be implemented as a photonic mixer device, PMD, a current assisted photonic demodulator, CAPD or a lateral drift-field photodetector, LDPD.

Consequently, when one of the reflected pulses RP impinges the photonic demodulator PDM, the photonic demodulator PDM detects the one of the reflected pulses RP, in particular detects electromagnetic radiation corresponding to the one of the reflected pulses RP, during a corresponding detection interval. The detection interval comprises a first interval and the second interval following the first interval. The first and the second interval have for example the same length. A timing of the detection interval depends on, in particular is defined by, a second clock signal C2 being generated by the processing circuit PRC and having a phase difference with respect to the first clock signal C1. Hence, also a timing of the first and the second interval, in particular a timing of a changeover from the first to the second interval, is defined by the second clock signal C2.

The photonic demodulator PDM is configured to detect a first portion of energy of the radiation detected during the first interval and a second portion of energy of the radiation detected during the second interval. In particular, this holds analogously for any of the reflected pulses RP being detected by the photonic demodulator PDM during respective detection intervals comprising respective first and respective second intervals.

The photonic demodulator PDM is further configured to generate a first demodulator signal DS1 depending on energy of radiation being detected during the first intervals, in particular depending on the first portion of energy, and a second demodulator signal DS2 depending on energy of radiation being detected during the second intervals, in particular depending on the second portion of energy.

The processing circuit PRC comprises a deviation unit DEV connected to the photonic demodulator PDM and receiving the first and the second demodulator signal DS1, DS2 from the photonic demodulator PDM.

The processing circuit PRC, in particular the deviation unit DEV, is configured to generate a first steering signal PU and a second steering signal PD depending on the first and the second demodulator signal DS1, DS2.

The deviation unit DEV may for example differentiate or effectively differentiate the first and the second demodulator signal DS1, DS2 and generate the first and the second steering signal PU, PD depending on the differentiation or the effective differentiation. Alternatively or in addition, the deviation unit DEV may for example subtract or effectively subtract a value of the first and the second demodulator signal DS1, DS2 from each other and generate the first and the second steering signal PU, PD depending on the subtraction order effective subtraction.

The processing circuit PRC further comprises a delay unit DU connected to the deviation unit DEV and to the photonic demodulator PDM. The delay unit DU is supplied with the first clock signal C1.

The processing circuit PRC, in particular the delay unit DU, is configured to generate the second clock signal C2 depending on the first clock signal C1. To this end, the delay unit is DU is for example configured to adapt the phase difference based on the first and the second steering signal PU, PD. The delay unit DU may be configured to generate the second clock signal C2 by delaying the first clock signal C1 by a delay depending on the first and the second demodulator signal DS1, DS2, in particular depending on the first and the second steering signal PU, PD. Consequently, the second clock signal C2 has the phase difference defined by the delay with respect to the first clock signal C1.

The processing circuit PRC, in particular the delay unit DU, is configured to generate an output signal OS indicative of a time-of-flight of the emitted and at least partially reflected pulses EP, RP. The delay unit DU is for example configured to generate the output signal OS based on the first and the second clock signal C1, C2 and/or based on the phase difference, particular based on the adapted phase difference. In particular, the phase difference, in particular the adapted phase difference, may be a measure for the time-of-flight.

Figure 2A:
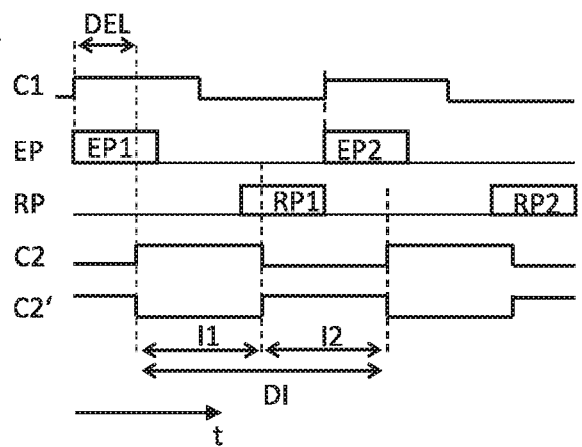
Figure 2B:
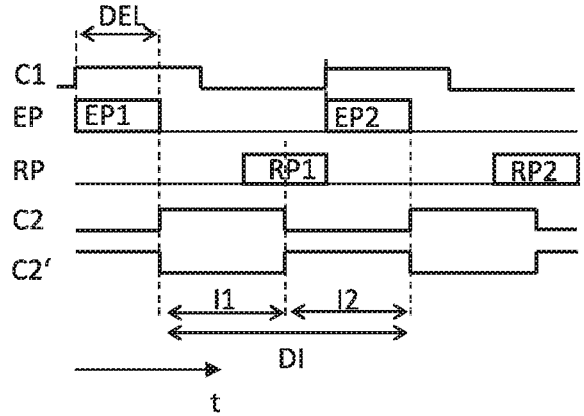
Figure 2C:
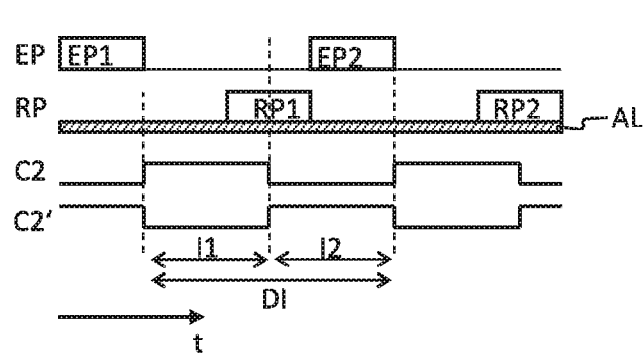

The adaption of the phase difference and the relation of the output signal OS to the time-of-flight is explained in more detail with respect to FIGS. 2A to 2C.

In some implementations, in particular depending on an actual implementation of the deviation unit DEV and/or the photonic demodulator PDM, the photonic demodulator PDM may receive the first and the second steering signal PU, PD for example for resetting the photonic demodulator PDM. Corresponding connections of outputs of the deviation unit DEV to the photonic demodulator PDM are shown in FIG. 1, however are optional. For more details, it is referred to FIGS. 3 to 5, 8A and 8B.

Furthermore, in FIG. 1 an optional filter F, in particular optical filter, arranged in front of the photonic demodulator PDM is shown. The filter F is for example configured and arranged to limit electromagnetic radiation, in particular light, received by the photonic demodulator PDM to the same or a similar bandwidth or spectrum as the bandwidth or spectrum of the emitted pulses EP.

FIG. 1 also shows a first optional optics arrangement OP1 configured and arranged to focus the electromagnetic radiation emitted by the emitter E for example onto the external object 0. Also an optional second optics arrangement OP2 is shown, which is configured and arranged to focus electromagnetic radiation, for example the at least partially reflected pulses RP, onto the photonic demodulator PDM and/or on an active region of the photonic demodulator PDM.

Moreover, in some implementations, the sensor arrangement comprises an optional beam splitter BS and an optional feedback unit FB connected to the processing circuit PRC, in particular to the delay unit DU. The beam splitter BS is for example configured and arranged to split off split off pulses SP from the emitted pulses EP. The feedback unit FB is for example configured and arranged to detect the split off pulses SP and to generate a feedback signal based on the split off pulses SP, in particular on a timing of the split off pulses SP. In such implementations, the processing circuit PRC, in particular the delay unit DU may be configured to generate the output signal OS based on the feedback signal or on the phase difference and the feedback signal. Therein, the feedback signal may for example be used to determine a starting instance of one of the emitted pulses EP particularly exact. In particular, the delay unit may also be configured to generate the output signal OS based on the feedback signal and the second clock signal C2 to determine the time-of-flight.

FIGS. 2A and 2B show timing diagrams of emitted and partially reflected electromagnetic pulses as well as clock signals in accordance with the improved concept, for example as occurring in a sensor arrangement as shown in FIG. 1. Shown are, as a function of time t, the first and the second clock signal C1, C2 as well as a modified second clock signal C2' being an inverse of the second clock signal C2. Furthermore, a first emitted pulse EP1 and a corresponding first at least partially reflected pulse RP1 as well as a second emitted pulse EP2 and a corresponding second at least partially reflected pulse RP2 are schematically depicted as rectangular a blocks extending over respective time periods. It is pointed out, that an in particular of the reflected pulses RP1, RP2 is not necessarily constant during the respective pulses but may vary for example depending on a structure of the external object O.

The first clock signal C1 is for example a digital signal switching between logic low and logic high with a duty cycle of for example 50%.

A detection interval DI is defined by the second clock signal C2, wherein the detection interval DI extends over one period of the second and the modified second clock signal C2, C2'. In particular, the detection interval DI may begin with a first rising edge of the second clock signal C2 and end with a second rising edge of the second clock signal C2 following the first rising edge. The detection interval DI comprises a first interval I1 and a second interval I2 defined by the second clock signal C2. The first interval I1 corresponds for example to a time interval during which the second clock signal C2 assumes logic high and the second interval I2 corresponds for example to a time interval during which the modified second clock signal C2' assumes logic high, that the second clock signal C2 assumes logic low.

The first interval I1 corresponds for example to a first half period of the second clock signal C2. In particular, the first interval I1 begins for example with the first rising edge of the second clock signal C2 and ends for example with a falling edge of the second clock signal C2 following the first rising edge and preceding the second rising edge of the second clock signal C2.

The second interval I2 corresponds for example to a second half period of the second clock signal C2. In particular, the second interval I2 begins for example with the falling edge of the second clock signal C2 and ends for example with the second rising edge of the second clock signal C2. Hence, the first interval I1 represents a first half of the detection interval DI and the second interval I2 represents a second half of the detection interval DI. It is noted, that in FIG. 2B an end of the first emitted pulse EP1 coincides with the first rising edge of the second clock signal C2 only coincidently.

One of the emitted pulses EP is for example emitted at each rising edge of the first clock signal C1. For example, the first emitted pulse EP1 is emitted starting at a first rising edge of the first clock signal C1 and the second emitted policy P2 is emitted starting at a second rising edge of the first clock signal C1.

The second clock signal C2 is delayed with respect to the first clock signal C1 by a delay DEL defining the phase difference between the first and the second clock signal C1, C2.

The photonic demodulator PDM generates the first demodulator signal DS1 based on energy detected during the first interval I1 and the second demodulator signal DS2 based on energy detected during the second interval I2. As shown in FIGS. 2A and 2B, a first portion of the first reflected pulse RP1 falls into the first interval I1 and a second portion of the first detected pulse RP1 falls into the second interval I2. As shown in FIG. 2A, the first and the second portion of the first reflected pulse RP1 have in general different lengths resulting in different amounts of energy detected by the photonic demodulator PDM during the first and the second interval I1, I2, respectively. In other words, an energy ratio given by a ratio of energy of radiation detected during the first interval I1 to energy of the radiation being detected during the second interval I2 differs from a predefined target interval, for example from unity. Consequently, the first and the second demodulation signal DS1, DS2 have different amplitudes in this case.

However, the processing circuit PRC is configured to regulate the energy ratio to the target ratio, for example to unity, by adapting the phase difference and/or the delay DEL, respectively. A result of the regulation is depicted in FIG. 2B, wherein the first reflected pulse RP1 is equally or approximately equally distributed between the first interval I1 and the second interval I2. In a situation as shown in FIG. 2B, the delay DEL is directly related to the time-of-flight of the emitted and effective pulses EP, RP, for example of the first emitted pulse EP1 and the first reflected pulse RP1.

In general, the time-of-flight is for example given by a starting instance of one of the emitted pulses EP, for example of the first emitted pulse EP1, and the corresponding one of the reflected pulses RP, for example the first reflected pulse RP1. In the situation of FIG. 2B, wherein the energy ratio is regulated to the target ratio unity, the time-of-flight can therefore be calculated directly from the corresponding delay DEL taking into account for example constant quantities. The constant quantities are for example given by a cycle time or a frequency of the second clock signal C2 and a length of one of the emitted pulses EP, for example the first emitted pulse EP1. Therein, the cycle time is the inverse of the frequency. In particular, the time-of-flight may be calculated as one half times the sum of the cycle time of the second clock signal C2 and the length of one of the emitted pulses EP if the energy ratio is regulated to the target ratio unity as shown in FIG. 2B.

Consequently, the output signal OS generated by the processing circuit PRC depending on the phase difference and/or the delay DEL is a measure for the time-of-flight if the energy ratio is regulated to the target ratio, for example to unity.

FIG. 2C shows a further timing diagram of emitted and partially reflected electromagnetic pulses as well as clock signals in accordance with the improved concept. The timing diagram of FIG. 2C is based on the timing diagram of FIG. 2B, wherein, for the sake of clarity, the first clock signal C1 and the delay DEL are omitted. Furthermore, a constant amount of ambient light AL that is for example detected by the photonic demodulator PDM is shown schematically.

In a realistic situation, the photonic demodulator PDM will not only detect the at least partially reflected pulses RP but also may detect ambient light AL. The detection of the ambient light AL may in principle affect the generation of the first and the second demodulator signal DS1, DS2 and consequently accuracy of the determination of the time-of-flight. However, since, according to the improved concept, the deviation unit DEV for example differentiates, effectively differentiates subtracts and/or effectively subtracts the first and the second demodulator signal DS1, DS2, an effect of the detected ambient light AL may be compensated or partially compensated. This compensation or partial compensation is inherent to the improved concept and may make an explicit measurement and/or compensation of ambient light unnecessary, leading to decreased complexity of the sensor arrangement according to the improved concept.

Figure 3:
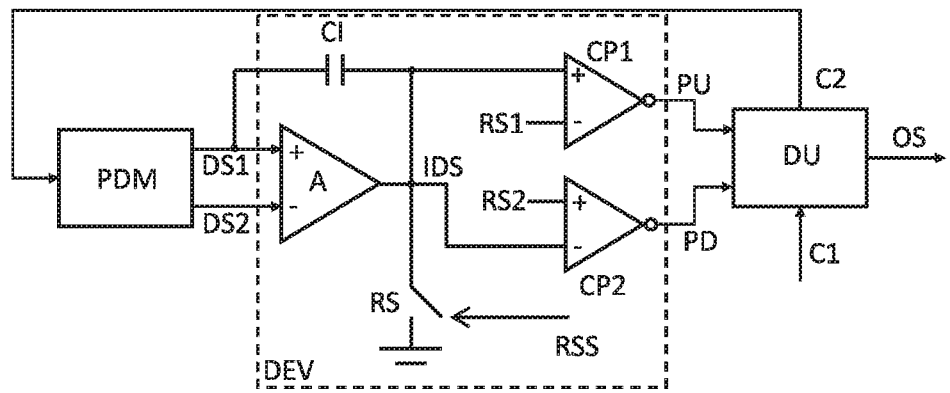

FIG. 3 shows a further implementation of an exemplary sensor arrangement according to the improved concept based on the implementation of FIG. 1. For the sake of clearness, the driver DRV, the emitter E, the external object O as well as the optional filter F, the optional first and second optics arrangements OP1, OP2 and the optional beam splitter BS are not shown.

In the implementation of FIG. 3, the deviation unit DEV comprises a differential integrator with a differential amplifier A, for example an operational amplifier, and an integrator capacitor C1. The differential amplifier A has a first input, for example a non-inverting input, coupled to the photonic demodulator PDM for receiving the first demodulator signal DS1 and a second input, for example an inverting input, coupled to the photonic demodulator PDM for receiving the second demodulator signal DS2. The integrator capacitor C1 is for example connected between the first input of the amplifier A and an output of the amplifier A. Consequently, the differential integrator is configured to generate an integrated difference signal IDS at the output of the differential amplifier A integrating a difference between the first and the second demodulator signal DS1, DS2.

The deviation unit DEV further comprises a first comparator CP1 with a first input, for example an inverting input, connected to a first reference signal RS1, a second input, for example a non-inverting input, connected to the output of the differential amplifier A and an output, for example an inverting output. The deviation unit DEV also comprises a second comparator CP2 with a first input, for example an inverting input, connected to the output of the differential amplifier A, a second input, for example a non-inverting input, connected to a second reference signal RS2 and an output, for example an inverting output. A value of the second reference signal RS2 is for example greater than a value of the first reference signal RS1. The output of the differential amplifier A is further connected to a reference terminal, for example a ground terminal, via a reset switch RS be controlled by a reset signal RSS.

The first comparator CP1 generates the first steering signal PU depending on a value of the integrated difference signal IDS being less or greater than the first reference signal RS1. In particular, the first steering signal PU may assume logic high if the value of the integrated difference signal IDS is less than the value of the first reference signal RS1 and may assume logic low if the value of the integrated difference signal IDS is greater than the value of the first reference signal RS1. Analogously, the second comparator CP2 generates the second steering signal PD depending on the value of the integrated difference signal IDS being less or greater than the second reference signal RS2. In particular, the second steering signal PD may assume logic high if the value of the integrated difference signal IDS is greater than the value of the second reference signal RS2 and may assume logic low if the value of the integrated difference signal IDS is less than the value of the second reference signal RS2.

The delay unit DU generates the second clock signal C2 by delaying the first clock signal C1 by the delay depending on the first and the second steering signal PU, PD. In particular, the delay unit DU adapts the delay and consequently the phase difference between the first and the second clock signal C1, C2, depending on the first and the second steering signal PU, PD. For example, the delay unit DU increases the delay if the first steering signal PU assumes logic high and the second steering signal PD assumes logic low. On the other hand, the delay unit DU for example decreases the delay if the first steering signal PU assumes logic low and the second steering signal PD assumes logic high.

The adapted delay in turn results in a shift of the first and the second intervals I1, I2 with respect to the partially reflected pulses RP, for example the first reflected pulse RP1, and consequently in a change of the first and the second demodulator signal DS1, DS2. Hence, also the integrated difference signal IDS is changed accordingly. In this way, the value integrated difference signal IDS is regulated to a target difference value lying between, for example in the middle between, the first and the second reference signal RS1, RS2. Therein, the energy ratio corresponds to the target ratio if the value of the integrated difference signal corresponds to the target difference value. In this way, the energy ratio is regulated to the target ratio.

The deviation unit DU may further comprise an integrator controller (not shown) configured to generate the reset signal RSS to reset the differential integrator.

Figure 4:
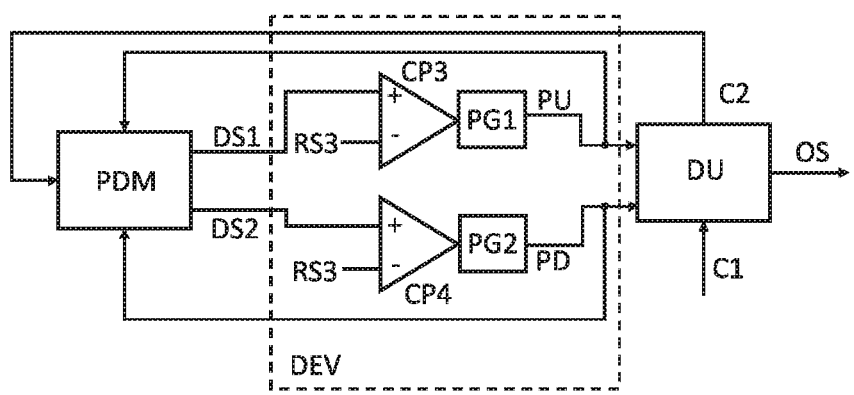

FIG. 4 shows a further implementation of an exemplary sensor arrangement according to the improved concept based on the implementation of FIG. 1. For the sake of clearness, the driver DRV, the emitter E, the external object O as well as the optional filter F, the optional first and second optics arrangements OP1, OP2 and the optional beam splitter BS are not shown.

In the implementation of FIG. 4, the deviation unit DEV comprises a third comparator CP3 with a first input, for example a non-inverting input, coupled to the photonic demodulator PDM for receiving the first demodulator signal DS1 and a second input, for example an inverting input, connected to a third reference signal RS3. Further, the deviation unit DEV comprises a fourth comparator CP4 with a first input, for example a non-inverting input, coupled to the photonic demodulator PDM for receiving the second demodulator signal DS2 and a second input, for example an inverting input, connected to the third reference signal RS3.

The deviation unit DEV also comprises a first pulse generator PG1 connected to an output of the third comparator CP3 and configured to generate the first steering signal PU depending on an output signal of the third comparator CP3. The deviation unit DEV further comprises a second pulse generator PG2 connected to an output of the fourth comparator CP4 and configured to generate the second steering signal PD depending on an output signal of the fourth comparator CP4.

The third comparator CP3 for example generates the output signal of the third comparator CP3 for example to assume logic high if the value of the first demodulator signal DS1 is greater than a value of the third reference signal RS3 and logic low if the value of the first demodulator signal DS1 is less than the value of the third reference signal RS3. Analogously, the fourth comparator CP4 for example generates the output signal of the fourth comparator CP4 for example to assume logic high if the value of the second demodulator signal DS2 is greater than a value of the third reference signal RS3 and logic low if the value of the second demodulator signal DS2 is less than the value of the third reference signal RS3.

The first pulse generator PG1 may for example generate a pulse, in particular a logic high pulse, of the first steering signal PU if the output signal of the third comparator CP3 assumes logic high and the second pulse generator PG2 may for example generate a pulse, in particular a logic high pulse, of the second steering signal PD if the output signal of the fourth comparator CP4 assumes logic high.

The delay unit DU may increase the delay in response to a pulse, for example a logic high pulse, of the first steering signal PU and decrease the delay in response to a pulse, for example a logic high pulse, of the second steering signal PD. Apart from that, the delay unit DU may generate the second clock signal C2 analogously as explained with respect to FIG. 3.

As explained earlier, the adapted delay in turn results in a shift of the first and the second intervals I1, I2 with respect to the partially reflected pulses RP, for example the first reflected pulse RP1, and consequently in a change of the first and the second demodulator signal DS1, DS2. In this way, the values of the first and the second demodulator signal DS1, DS2 are both regulated to the value of the third reference signal RS3. Therein, the energy ratio corresponds to the target ratio if the value of the first demodulator signal DS1 and the second demodulator signal DS2 both correspond to the value of the third reference signal RS3. In this case, the first and the second pulse generator PG1, PG2 may for example both generate pulses, for example logic high pulses, in the first and the second steering signal PU, PD, respectively. In this way, the energy ratio is regulated to the target ratio.

An output of the first pulse generator PG1 is for example connected to the photonic demodulator PDM for resetting or partially resetting the photonic demodulator PDM, in particular for resetting the first demodulator signal DS1, depending on the first steering signal PU. An output of the second pulse generator PG2 is for example connected to the photonic demodulator PDM for resetting or partially resetting the photonic demodulator PDM, in particular for resetting the second demodulator signal DS1, depending on the second steering signal PD. For further details on the resetting of the first and the second demodulator signal DS1, DS2, it is referred to FIG. 8B.

Figure 5:
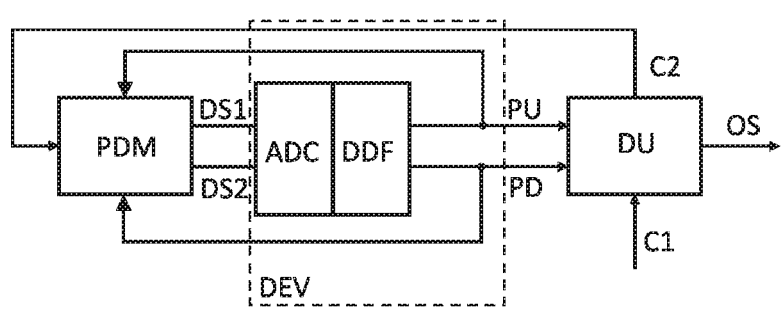

FIG. 5 shows a further implementation of an exemplary sensor arrangement according to the improved concept based on the implementation of FIG. 1. For the sake of clearness, the driver DRV, the emitter E, the external object O as well as the optional filter F, the optional first and second optics arrangements OP1, OP2 and the optional beam splitter BS are not shown.

In the implementation of FIG. 5, the deviation unit DEV comprises an analog-to-digital converter ADC connected to the photonic demodulator PDM for receiving the first and the second demodulator signal DS1, DS2. The deviation unit further comprises a digital differentiator DDF with at least one input connected to at least one output of the analog-to-digital converter.

The analog-to-digital converter ADC is for example configured to convert the first demodulator signal DS1 and to a first digital signal and the second demodulator signal DS2 into a second digital signal. The digital differentiator DFF is for example configured to generate at a first output the first steering signal PU and at a second output of the second steering signal PD. To this end, the differentiator DFF may compare the first and the second steering signal PU, PD to each other and/or subtract the first and the second steering signal PU, PD from each other and evaluate their difference. For example, the digital differentiator may generate a pulse, for example a logic high pulse, in the first steering signal PU, if the first digital signal exceeds the second digital signal by at least a tolerance value and may generate a pulse, for example a logic high pulse, the second steering signal PD, if the second digital signal exceeds the first digital signal by at least the tolerance value or vice versa.

Then, the operation of the delay unit DU and the regulation of the energy ratio to the target ratio is for example performed as explained with respect to FIG. 4.

The first output of the digital differentiator DFF is for example connected to the photonic demodulator PDM for resetting or partially resetting the photonic demodulator PDM, in particular for resetting the first demodulator signal DS1, depending on the first steering signal PU. The second output of the digital differentiator is for example connected to the photonic demodulator PDM for resetting or partially resetting the photonic demodulator PDM, in particular for resetting the second demodulator signal DS1, depending on the second steering signal PD. For further details on the resetting of the first and the second demodulator signal DS1, DS2, it is referred to FIG. 8B.

Figure 6:
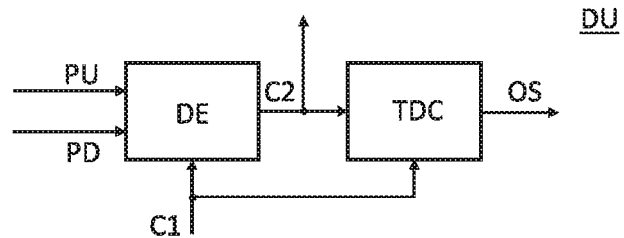

FIG. 6 shows an exemplary implementation of a delay unit for implementation in a sensor arrangement according to the improved concept, for example an implementation as shown in FIGS. 1 and/or 3 to 5.

The delay unit DU comprises a programmable delay element DE connected to the deviation unit DEV for receiving the first and the second steering signal PU, PD. The programmable delay element DE has a control input connected to the first clock signal C1. The programmable delay element DE is for example implemented as a programmable delay line. In some implementations, the programmable delay element DE is comprised by or is implemented as a delay-locked-loop circuit.

The delay unit DU further comprises a time-to-digital converter TDC with a first input connected to the first clock signal C1 and a second input connected to the programmable delay element DE for receiving the second clock signal C2.

The programmable delay element DE is configured to generate the second clock signal C2 by delaying the first clock signal C1 by the delay, as described with respect to FIGS. 1 to 5. The programmable delay element DE may be configured to increase the delay depending on the first steering signal PU and to decrease the delay depending on the second steering signal PD. For example, the programmable delay elements DE may be configured to increase the delay if the first steering signal PU assumes logic high, as described with respect to FIG. 3, or if the first steering signal PU has a pulse, in particular a logic high pulse, as described with respect to FIGS. 4 and 5. Analogously, the programmable delay element DE2 may be configured to decrease the delay if the second steering signal PD assumes logic low, as described with respect to FIG. 3, or if the second steering signal PD has a pulse, in particular a logic high pulse, as described with respect to FIGS. 4 and 5.

The first clock signal C1 may for example act as a start signal for the time-to-digital converter TDC and the second clock signal C2 may for example act as a stop signal for the time-to-digital converter TDC. That is, for example the time-to-digital converter TDC may for example be configured to determine an elapsed time between a rising edge of the first clock signal C1 and a subsequent rising edge of the second clock signal C2. Therein, the rising edge of the first clock signal C2 may indicate a start of one of the emitted pulses EP. The rising edge of the second clock signal C2 has a fixed relation to the start of the corresponding one of the reflected pulses RP, if the energy ratio is regulated to the target ratio, as described with respect to FIG. 2B. The time-to-digital converter TDC may for example generate the output signal OS depending on the determined elapsed time.

In this way, the delay unit DU may effectively determine the time-of-flight, in particular generate the output signal OS being indicative of the time-of-flight, as described with respect to FIGS. 1 to 5.

In alternative implementations, the first input of the time-to-digital converter is connected to the feedback signal. In such implementations, the feedback signal may act as the start signal and the second clock signal C2 may act as the stop signal. As the rising edge of the first clock signal C1, also the feedback signal is indicative of the start of the one of the emitted pulses EP and may therefore be used by the time-to-digital converter TDC to generate the output signal OS. This may for example lead to a further improved accuracy of the time-of-flight determination.

Figure 7:
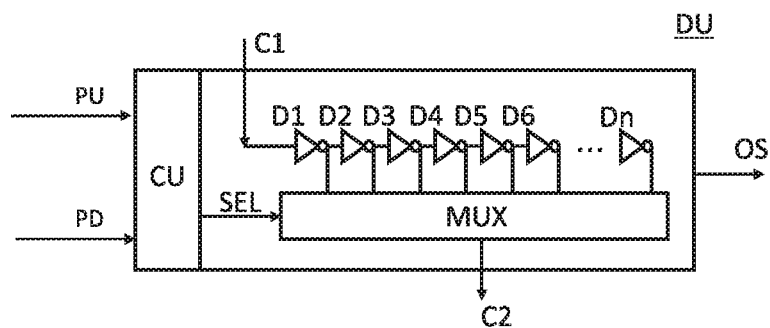

FIG. 7 shows a further exemplary implementation of a delay unit DU for implementation in a sensor arrangement according to the improved concept, for example an implementation as shown in FIGS. 1 and/or 3 to 5.

The delay unit DU comprises a plurality of n delay elements D1, D2, D3, D4, D5, D6, . . . , Dn connected in series, wherein n is equal to or greater than two. A first delay element D1 of the n delay elements receives the first clock signal C1 at an input. At least some of the delay elements D1, D2, D3, D4, D5, D6, . . . , Dn may for example be implemented as or comprise inverters. It is highlighted, that the depiction of seven or more delay elements in FIG. 7 does not imply that n must be seven or more. In particular, additional delay elements are straightforwardly to be removed from the representation of FIG. 7 in case the respective implementation of the delay unit DU comprises less than seven delay elements.

The delay unit DU further comprises a control unit CU connected to the deviation unit DEV for receiving the first and the second steering signal PU, PD and a multiplexer MUX with at least n inputs connected to respective outputs of the n delay elements D1, D2, D3, D4, D5, D6, . . . , Dn. The control unit CU is configured to generate a selection signal SEL based on the first and the second steering signal PU, PD. The multiplexer has a control input for receiving the selection signal SEL.

Each of the delay elements D1, D2, D3, D4, D5, . . . , D6, Dn may for example be configured to generate a respective intermediate clock signal by delaying a respective input signal by an intermediate delay. For example, the first delay element D1 may be configured to generate a first intermediate clock signal by delaying the first clock signal C1 by the intermediate delay and supply the first intermediate clock signal to the multiplexer MUX. The second delay element D2 may be configured to generate a second intermediate clock signal by delaying the first intermediate clock signal by the intermediate clock signal and supply the second intermediate clock signal to the multiplexer MUX, and so forth.

Consequently, the first intermediate clock signal is for example delayed with respect to the first clock signal C1 by the intermediate delay, the second intermediate clock signal is for example delayed by twice the intermediate delay and so forth. The n-th delay element Dn may be configured to generate an n-th intermediate clock signal by delaying the (n-1)-th intermediate clock signal by the intermediate delay and supply the n-th intermediate clock signal to the multiplexer MUX. Thus, the n-th intermediate clock signal is delayed with respect to the first clock signal C1 by n times the intermediate delay.

The multiplexer MUX is for example configured to generate the second clock signal C2 by selecting one of the at least two intermediate clock signals depending on the selection signal SEL. In particular, the selection signal SEL may indicate an index i being an integer number which is at least one and smaller or equal to n. The multiplexer MUX is for example configured to select the one of the intermediate clock signals being delayed with respect to the first clock signal C1 by i times the intermediate delay. The delay of the second clock signal C2 with respect to the first clock signal C1 is then given by i times the intermediate delay.

The control unit CU is for example configured to increase the index i by one if the first steering signal PU assumes logic high, as described with respect to FIG. 3, or if the first steering signal PU has a pulse, in particular a logic high pulse, as described with respect to FIGS. 4 and 5. Analogously, the control unit CU is for example configured to decrease the index i by one if the second steering signal PD assumes logic low, as described with respect to FIG. 3, or if the second steering signal PD has a pulse, in particular a logic high pulse, as described with respect to FIGS. 4 and 5.

The delay unit DU, for example the control unit CU, is for example configured to generate the output signal OS depending on the index i.

The delay elements D1, D2, D3, D4, D5, D6, Dn, the multiplexer MUX and/or the control unit CU are for example comprised by a time-to-digital converter.

An implementation of the delay unit DU as described with respect to FIG. 7 may further reduce the complexity of the sensor arrangement by combining several components or all components of the delay unit DU into a single time-to-digital converter.

Furthermore such implementations may have the advantage that a value of the phase difference of the second clock signal C2 with respect to the first clock signal C1 is directly available in the sensor arrangement as the index i. In particular in conjunction with an analog-to-digital converter, for example an analog-to-digital converter ADC as shown in the implementation of the deviation unit DU of FIG. 5, the sensor arrangement may also be able to perform advanced functions such as speech shifting of the phase difference. This may be particularly advantageous with the use of more than two phases of demodulation as described with respect to FIGS. 9, 10A and 10B respectively.

Figure 8A:
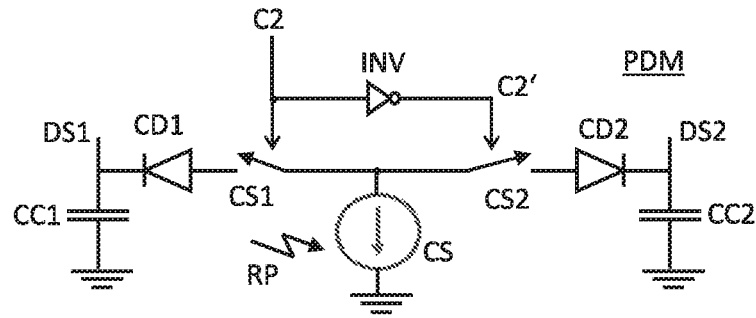

FIG. 8A shows a schematic representation of an exemplary implementation of a photonic demodulator PDM for implementation in a sensor arrangement according to the improved concept, for example in an implementation as described with respect to FIGS. 1 and 3.

The photonic demodulator PDM comprises a first collector with a first collector diode CD1 and a first collector capacitor CC1 coupled with a first electrode to the first collector diode CD1 and with a second electrode to a first reference terminal, for example a ground terminal. The photonic demodulator PDM also comprises a second collector with a second collector diode CD2 and a second collector capacitor CC2 coupled with a first electrode to the second collector diode CD2 and with a second electrode to a second reference terminal, for example the ground terminal.

The photonic demodulator PDM comprises also a photocurrent generating device, for example one or more photodetectors, being represented in FIG. 8A by a current source CS.

The photonic demodulator PDM further comprises an inverter INV configured to generate the modified second clock signal CT by inverting the second clock signal. Furthermore, the photonic demodulator PDM comprises a first collector switch CS1 being controlled by the second clock signal C2 and coupling the first collector diode CD1 to an output of the current source CS as well as a second collector switch CS2 being controlled by the modified second clock signal C2' and coupling the second collector diode CD2 to the output of the current source CS. It is highlighted, that the polarities of the first and the second collector diodes CS1, CS2 as shown in FIG. 8A are chosen as examples only. In particular, the polarities of the first and the second collector diodes CS1, CS2 may be inverted depending on the specific implementation of the sensor arrangement, in particular of the deviation unit DEV and/or the photocurrent generating device.

The current source CS, or the photocurrent generating device, respectively, may be configured to generate at its output a photocurrent when electromagnetic radiation, in particular one of the at least partially reflected pulses RP, for example the first reflected pulse RP1, impinges onto the photocurrent generating device.

During the first interval I1, the first collector switch CS1 is for example closed while the second collector switch CS2 is open and the first collector capacitor CC1 is charged via the first collector diode CD1 by the photocurrent. During the second interval I2, the second collector switch CS2 is for example closed while the first collector switch CS1 is open and the second collector capacitor CC2 is charged via the second collector diode CD2 by the photocurrent. In this way, the first demodulator signal DS1 may be generated at the first electrode of the first collector capacitor CC1 and the second demodulator signal DS2 may be generated at the first electrode of the second collector capacitor CC2.

In alternative implementations, the first collector capacitor CC1 is for example discharged via the first collector diode CD1 by the photocurrent during the first interval I1 and the second collector capacitor CC2 is for example discharged via the second collector diode CD2 by the photocurrent during the second interval I2.

Figure 8B:
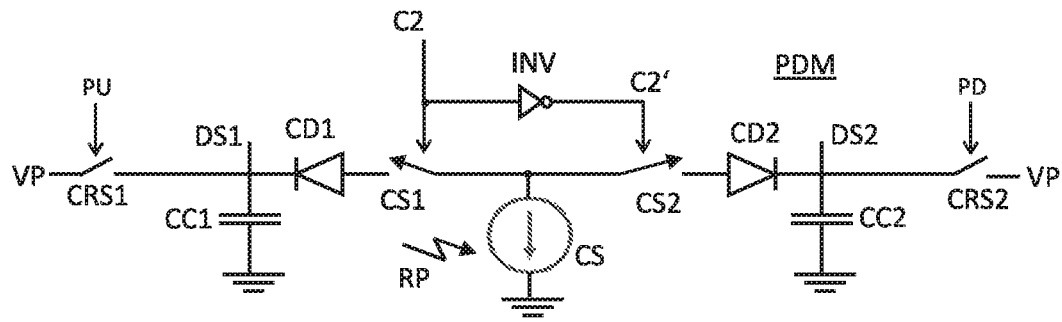

FIG. 8B shows a schematic representation of a further exemplary implementation of a photonic demodulator PDM for implementation in a sensor arrangement according to the improved concept, for example in an implementation as described with respect to FIGS. 1, 4 and 5.

The photonic demodulator PDM of FIG. 8B is based on the implementation described with respect to FIG. 8A. In addition, the first electrode of the first collector capacitor CC1 is connected via a first collector reset switch CRS1, which is controlled by the first steering signal PU, to a pre-charging voltage VP and the first electrode of the second collector capacitor CC2 is connected via a second collector reset switch CRS2, which is controlled by the second steering signal PD, to the pre-charging voltage VP.

Initially the first and the second collector capacitor CC1, CC2 may be charged by the pre-charging voltage VP. During the first interval I1, the first collector switch CS1 is for example closed while the second collector switch CS2 is open and the first collector capacitor CC1 is discharged via the first collector diode CD1 by the photocurrent. During the second interval I2, the second collector switch CS2 is for example closed while the first collector switch CS1 is open and the second collector capacitor CC2 is discharged via the second collector diode CD2 by the photocurrent. In this way, the first demodulator signal DS1 may be generated at the first electrode of the first collector capacitor CC1 and the second demodulator signal DS2 may be generated at the first electrode of the second collector capacitor CC2.

When the first steering signal PU has a pulse, in particular a logic high pulse, the first collector reset switch CRS1 is temporarily closed resetting the first collector, in particular resetting the first demodulator signal DS1, by re-charging the first collector capacitor CC1 with the pre-charging voltage. Analogously, when the second steering signal PD has a pulse, in particular a logic high pulse, the second collector reset switch CRS2 is temporarily closed resetting the second collector, in particular resetting the second demodulator signal DS2, by re-charging the second collector capacitor CC2 with the pre-charging voltage.

FIG. 9 shows a schematic representation of a further exemplary implementation of a photonic demodulator for implementation in a sensor arrangement according to the improved concept, for example in an implementation as described with respect to FIGS. 1 and 3 to 5.

The photonic demodulator PDM of FIG. 9 is based on the implementation described with respect to FIG. 8A. Instead of the second clock signal C2, a third clock signal C3 controls the first collector switch CS1 and instead of the modified second clock signal C2', a modified third clock signal C3' controls the second collector switch CS2.

The photonic demodulator PDM further comprises a third collector with a third collector diode CD3 and a third collector capacitor CC3 coupled with a first electrode to the third collector diode CD3 and with a second electrode to a third reference terminal, for example the ground terminal. The photonic demodulator PDM also comprises a third collector switch CS3 being controlled by a further modified third clock signal C3".

Instead of or in addition to the inverter INV shown in FIGS. 8A and 8B, the photonic demodulator PDM comprises a switch control unit (not shown) configured to generate the third clock signal C3, the modified third clock signal C3' and the further modified third clock signal C3" based on the second clock signal C2.

In such implementations, the detection interval DI as well as the first and the second interval I1, I2 are for example defined by the third and the modified third clock signal C3, C3'. A third interval I3 is for example defined by the further modified third clock signal C3". The first interval I1 corresponds for example to a time interval during which the third clock signal C3 assumes logic high, the second interval I2 corresponds for example to a time interval during which the modified third clock signal C3' assumes logic high and the third interval I3 corresponds for example to a time interval during which the further modified third clock signal C3" assumes logic high.

For further details of the third, the modified third and the further modified third clock signal C3, C3', C3" and their relation to the second clock signal C2, it is referred to FIGS. 10A and 10B.

During the first interval I1, the first collector switch CS1 is for example closed while the second and the third collector switch CS2, CS3 are open and the first collector capacitor CC1 is charged via the first collector diode CD1 by the photocurrent. During the second interval I2, the second collector switch CS2 is for example closed while the first and the third collector switch CS2, CS3 are open and the second collector capacitor CC2 is charged via the second collector diode CD2 by the photocurrent. During the third interval I3, the third collector switch CS3 is for example closed while the first and the second collector switch CS1, CS2 are open and the third collector capacitor CC3 is charged via the third collector diode CD3 by the photocurrent. In this way, the first demodulator signal DS1 may be generated at the first electrode of the first collector capacitor CC1, the second demodulator signal DS2 may be generated at the first electrode of the second collector capacitor CC2 and a third demodulator signal DS3 may be generated at the first electrode of the third collector capacitor CC3.

FIG. 10A shows a timing diagram of emitted and partially reflected electromagnetic pulses as well as clock signals in accordance with the improved concept, for example as occurring in a sensor arrangement with a photonic demodulator PDM as shown in FIG. 9. Shown are, as a function of time t, the first, the second, the modified second, the third, the modified third and the further modified third clock signal C1, C2, C2', C3, C3', C3". Furthermore, a first emitted pulse EP1 and a corresponding first at least partially reflected pulse RP1 as well as a second emitted pulse EP2 and the corresponding second at least partially reflected pulse RP2 are schematically depicted as rectangle a blocks covering respective time periods.

As described with respect to FIGS. 2A and 2B, the first and the second clock signal C1, C2 are for example digital signals switching between logic low and logic high with a duty cycle of for example 50%. On the other hand, the third clock signal C3 is for example a digital signal switching between logic low in logic high at a duty cycle differing from 50%.

In the example of FIG. 10A, the duty cycle of the third clock signal C3 is one third. The third clock signal C3 is for example in phase with the second clock signal C2, that is every rising edge of the third clock signal C3 coincides with a rising edge of the second clock signal C2 and vice versa. In the example shown in FIG. 10A, the modified third clock signal C3' corresponds to the third clock signal C3 up to a phase shift. The phase shift of the modified third clock signal C3' with respect to the third clock signal C3 is for example $2\pi/3$. Analogously, the further modified third clock signal C3" corresponds to the modified third clock signal C3' up to a phase shift. The phase shift of the further modified third clock signal C3" with respect to the modified third clock signal C3' is for example $2\pi/3$.

The operation of a sensor arrangement with a photonic demodulator PDM as shown in FIG. 9 and with third, modified third and further modified third clock signals C3, C3', C3" as an FIG. 10A similar to the operation described earlier with respect to FIGS. 1 to 8B.

The processing circuit PRC is for example configured to perform an initial measurement to determine during which of the intervals I1, I2, I3, the photonic demodulator PDM shows a maximum response, for example due to the first reflected pulse RP1 impinging on the photonic demodulator PDM. Then, depending on a result of the initial measurement, the processing circuit PRC, in particular the delay unit DU may pre-adjust the delay between the second clock signal C2 and the first clock signal C1. In particular, the delay may be pre-adjusted such that the energy ratio is already relatively close to the target ratio. In this way, particularly fast regulation of the entry ratio to the target ratio may be achieved.

In the following operation of the sensor arrangement, the third clock signal C3 assumes the role of the second clock signal C2 and the modified third clock signal C3' assumes the role of the modified second clock signal C2'. Apart from that, the operation of the sensor arrangement is analogous to what has been described with respect to FIGS. 1 to 8B.

FIG. 10B shows a timing diagram of emitted and partially reflected electromagnetic pulses as well as clock signals in accordance with the improved concept, for example as occurring in a sensor arrangement with a photonic demodulator PDM as shown in FIG. 9. The timing diagram of FIG. 10B is based on the timing diagram of FIG. 10A.

Also here, the third clock signal C3 is for example in phase with the second clock signal C2, that is every rising edge of the third clock signal C3 coincides with a rising edge of the second clock signal C2 and vice versa. In the example of FIG. 10B, the duty cycle of the third clock signal C3 is for example one fourth or approximately one fourth. The modified third clock signal C3' corresponds for example to the third clock signal C3 up to a phase shift. The phase shift of the modified third clock signal C3' with respect to the third clock signal C3 is for example $\pi/2$. The further modified clock signal C3" corresponds for example to the third clock signal C3 of the phase shift. The phase shift of the further modified third clock signal C3" with respect to the third clock signal C3 is for example $\pi$. The duty cycle of the further modified third clock signal C3" is for example 50%.

Consequently, the first and the second interval I1, I2 being defined for example by the third clock signal C3 and the modified third clock signal C3', respectively, being logic high have for example equal length. On the other hand, the third interval I3 being defined for example by the further modified third clock signal C3" being logic high may have a length being twice the length of the first and the second interval I1, I3.

The processing circuit PRC is for example configured to perform an initial measurement to determine during which of the intervals I1, I2, I3, the photonic demodulator PDM shows a maximum response, for example due to the first reflected pulse RP1 impinging on the photonic demodulator PDM. Then, the phase difference between the second and the first clock signal C2, C1 is for example adapted such that the tools shorter intervals I1, I2 lie around the maximum response. In this way, particularly fast regulation of the entry ratio to the target ratio may be achieved.

By means of a sensor arrangement and/or and method according to the improved concept, complexity and/or power consumption of the time-of-flight determination may be reduced.

Furthermore, in realistic situations, the at least partially reflected pulses RP may not be clean square waves as the emitted pulses EP may be but may vary representing for example a convolution of different surfaces of the external object. Errors or inaccuracies resulting thereof may for example be reduced or avoided by means of the improved concept, in particular by regulating the energy ratio to the target ratio.

It is pointed out that the number of collectors of the photonic demodulator PDM is not limited to two or three. In analogy to the implementations described with respect to FIGS. 8A-9, also photonic demodulators with four or more collectors may be utilized for implementing the improved concept.

The invention claimed is:

1. A sensor arrangement for determining a time-of-flight of electromagnetic radiation, the sensor arrangement comprising:
    an emitter configured to periodically emit pulses of electromagnetic radiation depending on a first clock signal;
    a photonic demodulator configured to:
        detect electromagnetic radiation during detection intervals, wherein a timing of the detection intervals is defined by a second clock signal having a phase difference with respect to the first clock signal, and wherein each of the detection intervals comprises a first interval and a second interval following the first interval;
        generate a first demodulator signal depending on energy of the radiation detected during at least one of the first intervals; and
        generate a second demodulator signal depending on energy of the radiation detected during at least one of the second intervals; and
    a processing circuit configured to adapt the phase difference based on the first and the second demodulator signal and to generate an output signal being indicative of the time-of-flight based on the phase difference, wherein the processing circuit comprises a delay unit configured to generate the second clock signal by delaying the first clock signal by a delay, the delay depending on the first and the second demodulator signals.

2. The sensor arrangement according to claim 1, wherein the processing circuit is configured to regulate an energy ratio to a target ratio by adapting the phase difference, wherein the energy ratio is a ratio of energy of the radiation, which is being detected during the first interval of one of the detection intervals, to energy of the radiation, which is being detected during the second interval of the one of the detection intervals.

3. The sensor arrangement according to claim 1, wherein the processing circuit comprises a time-to-digital converter configured to generate the output signal based on the first and the second clock signal.

4. The sensor arrangement according to claim 1, wherein the processing circuit comprises:
    a delay line configured to generate at least two intermediate clock signals by delaying the first clock signal; and
    a multiplexer configured to generate the second clock signal by selecting one of the at least two intermediate clock signals depending on the first and the second demodulator signal.

5. The sensor arrangement according to claim 1, wherein the processing circuit:
    comprises a deviation unit configured to generate at least one steering signal based on the first and the second demodulator signal; and
    is configured to adapt the phase difference based on the least one steering signal.

6. The sensor arrangement according to claim 5, wherein the at least one steering signal indicates:
    whether a difference value of the first and the second demodulator signal lies within a predefined first range; or
    indicates whether a value of the first demodulator signal lies within a predefined second range and/or a value of the second demodulator signal lies within the predefined second range.

7. The sensor arrangement according to claim 5, wherein the deviation unit:
    comprises a differential integrator configured to generate an integrated difference signal depending on a difference between the first and the second demodulator signal; and
    is configured to generate the at least one steering signal depending on the integrated difference signal.

8. The sensor arrangement according to claim 7, wherein the deviation unit comprises:
    a first comparator configured to generate a first steering signal of the least one steering signal based on a comparison of a value of the integrated difference signal to a predefined first threshold value; and
    a second comparator configured to generate a second steering signal of the least one steering signal based on a comparison of the value of the integrated difference signal to a predefined second threshold value.

9. The sensor arrangement according to claim 5, wherein the deviation unit comprises:
    a first pulse generator configured to generate a first steering signal of the least one steering signal based on a comparison of the first demodulator signal to a predefined threshold value; and
    a second pulse generator configured to generate a second steering signal of the least one steering signal based on a comparison of second demodulator signal to the predefined threshold value or to another predefined fourth threshold.

10. The sensor arrangement according to claim 5, wherein the deviation unit comprises an analog-to-digital converter configured to convert the first and the second demodulator signal into a first and a second digital signal, respectively, or into a digital difference signal.

11. The sensor arrangement according to claim 10, wherein the deviation unit comprises a digital differentiator configured to generate the at least one steering signal depending on at least one of the first digital signal, the second digital signal and the digital difference signal.

12. The sensor arrangement according to claim 1, wherein the photonic demodulator comprises a first collector configured to generate the first demodulator signal based on the energy of the radiation detected during the at least one of the first intervals and a second collector configured to generate the second demodulator signal based on the energy of the radiation detected during the at least one of the second intervals.

13. A method for determining a time-of-flight of electromagnetic radiation, the method comprising:
   periodically emitting pulses of electromagnetic radiation depending on a first clock signal;
   detecting electromagnetic radiation during detection intervals, wherein a timing of the detection intervals is defined by a second clock signal having a phase difference with respect to the first clock signal and each of the detection intervals comprises a first interval and a second interval following the first interval;
   generating a first demodulator signal depending on energy of the radiation detected during at least one of the first intervals;
   generating a second demodulator signal depending on energy of the radiation detected during at least one of the second intervals;
   adapting the phase difference based on the first and the second demodulator signal; and
   generating an output signal being indicative of the time-of-flight based on the phase difference,
   wherein the second clock signal is generated by delaying the first clock signal by a delay, the delay depending on the first and the second demodulator signals.

14. The method according to claim 13, wherein the phase difference is adapted to control an energy ratio to a target ratio by the adapting of the phase difference, wherein the energy ratio is a ratio of energy of the radiation being detected during the first interval of one of the detection intervals to energy of the radiation being detected during the second interval of the one of the detection intervals.

* * * * *

UNITED STATES PATENT AND TRADEMARK OFFICE
CERTIFICATE OF CORRECTION

PATENT NO. : 10,761,197 B2
APPLICATION NO. : 15/777887
DATED : September 1, 2020
INVENTOR(S) : Kerry Glover Page 1 of 1

It is certified that error appears in the above-identified patent and that said Letters Patent is hereby corrected as shown below:

In the Claims

<u>Column 26</u>
Claim 7, Line 37, delete "unit;" and insert -- unit: --.
Claim 9, Line 64, before "threshold." delete "fourth".

Signed and Sealed this
Twenty-seventh Day of October, 2020

Andrei Iancu
*Director of the United States Patent and Trademark Office*